May 28, 1963 L. B. STEIN, JR 3,091,731
POWER FACTOR CORRECTION APPARATUS FOR ALTERNATING
CURRENT POWER DISTRIBUTION SYSTEMS
Original Filed Jan. 27, 1959 3 Sheets-Sheet 1

INVENTOR.
L.B.Stein.Jr.
BY Moses, Mc.Glew & Toren.
ATTORNEYS.

May 28, 1963 L. B. STEIN, JR 3,091,731
POWER FACTOR CORRECTION APPARATUS FOR ALTERNATING
CURRENT POWER DISTRIBUTION SYSTEMS
Original Filed Jan. 27, 1959 3 Sheets-Sheet 3
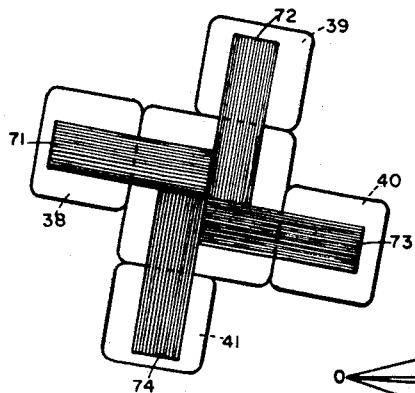
FIG. 5
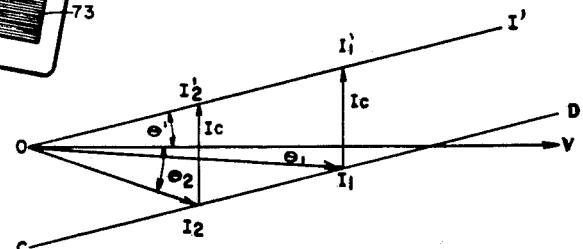
FIG. 6
FIG. 7
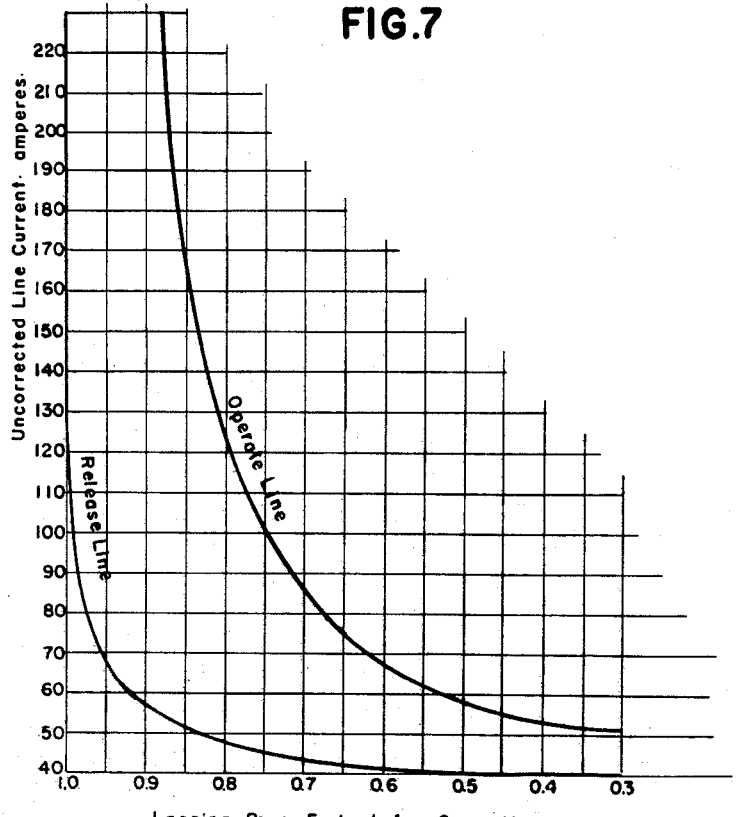
FIG. 8   Lagging Power Factor before Correction
INVENTOR.
L.B. Stein. Jr.
BY Moses, Mc.Glew & Toren.
ATTORNEYS.

United States Patent Office 3,091,731
Patented May 28, 1963

3,091,731
POWER FACTOR CORRECTION APPARATUS FOR ALTERNATING CURRENT POWER DISTRIBUTION SYSTEMS
Laurence B. Stein, Jr., Hingham, Mass., assignor to Sigma Instruments, Inc., a corporation of Massachusetts
Original application Jan. 27, 1959, Ser. No. 789,311. Divided and this application May 24, 1961, Ser. No. 112,390
6 Claims. (Cl. 323—102)

The present invention relates to apparatus for determining the magnitude and phase angle of a current relative to a reference voltage of an alternating current electric power distribution system and in particular to apparatus for the correction of the power factor of such a system by the switching of fixed capacitors across a transmission line, and also to discrimination between the two possible directions of power flow.

It is known that, in a power distribution system, it is desirable to minimize the reactive power (vars) which must be interchanged between load and source, for both economic and operational reasons. In general the vars represent reactive power stored in the load and returned to the circuit twice each cycle, without doing any useful work. In the usual power system, the reactive energy is stored in the magnetic field associated with a load and must be returned twice per cycle to the source or other energy-storage device. If a storage device, such as a capacitor, is connected to the circuit near the load, the energy need not be returned to the source. This results in a reduction of the current necessary to supply the useful power (watts) to the load. If, however, the storage device (capacitor) remains connected to the circuit after all or part of the reactive portion of the load has been removed, the total current supplied by the source is no longer the minimum required, since an additional component is required to supply reactive power to the capacitor.

In the usual application of fixed capacitors installed on a distribution system for compensating inductive loads (power factor correction), it is desirable to connect them to the circuit when correction is required, and disconnect them at other times. The capacitors represent fixed units or blocks of correction, usually rated in vars or kilovars. The rating in vars is the product of the voltage applied and the current drawn by the capacitor. It may be shown that an inductive load requiring a given number of vars may be exactly compensated to unity power factor by connecting a capacitor rated at that number of vars.

It is accordingly an object of this invention to provide an improved means to sense the conditions when the capacitor should be connected and to cause it to be connected, and to recognize the conditions when the capacitor should be disconnected and to cause it to be disconnected.

It is another object of the invention to accomplish the connection and disconnection of the power correcting capacitor without making additional electrical connections to the transmission line or circuit being monitored.

Still another object of the invention is to accomplish the above-described power-factor correction with a minimum of moving parts and in particular without the use of low-torque electro-mechanical phase sensing devices.

The above and other objects and advantages of the invention will be fully understood from the following description and the drawings in which:

FIG. 5 is a view of the coil arrangement of the saturable reactor; and

FIGS. 6 to 8 are diagrams illustrating the operation of the apparatus.

Figure 1:
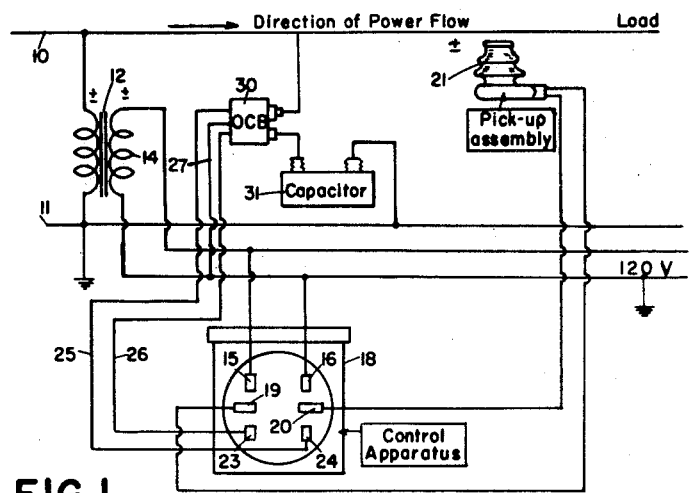
FIG. 1 is a schematic diagram of one embodiment of the invention.

Referring particularly to FIG. 1, there is shown a circuit which may be one phase of a three phase high-voltage alternating current power distribution line 10, 11 having a distribution transformer 12 connected thereacross. The secondary winding 14 of the transformer may provide a 120 volt output and be connected to terminals 15, 16 of control apparatus 18 which will be described in detail hereinafter. The apparatus 18 also has terminals 19, 20 connected to a pick-up assembly 21 which is positioned close to one of the conductors of transmission line 10, 11. As will be described more fully later, pick-up assembly 21 includes a coupling device such as a coil inductively coupled to line 10 for picking up a voltage in response to the current through the line, without the necessity of breaking into the line or making any electrical connections thereto. The output terminals 23 and 24 of apparatus 18 and a neutral which may be obtained from terminal 16 are connected by conductors 25, 26 and 27 to a device 30 which may be an oil circuit breaker for connecting and disconnecting the fixed capacitor 31 from the transmission line 10, 11. The apparatus 18 compares the voltage picked up by secondary winding 14, which voltage is representative of the voltage across transmission line 10, 11 and of substantially constant phase relative to the transmission line voltage, with an electrical quantity supplied by the pick-up assembly 21, which corresponds in magnitude and phase angle to the current through the transmission line. When the electrical quantities supplied to apparatus 18 by secondary winding 14 and pick-up assembly 21 indicate that the load connected to the transmission line is drawing a pre-determined high reactive power, the circuit breaker 30 is operated to connect the capacitor 31 across the line. When the reactive power transversing the transmission line reaches another predetermined level, circuit breaker 30 is operated to disconnect capacitor 31 from the transmission line.

Figure 2:
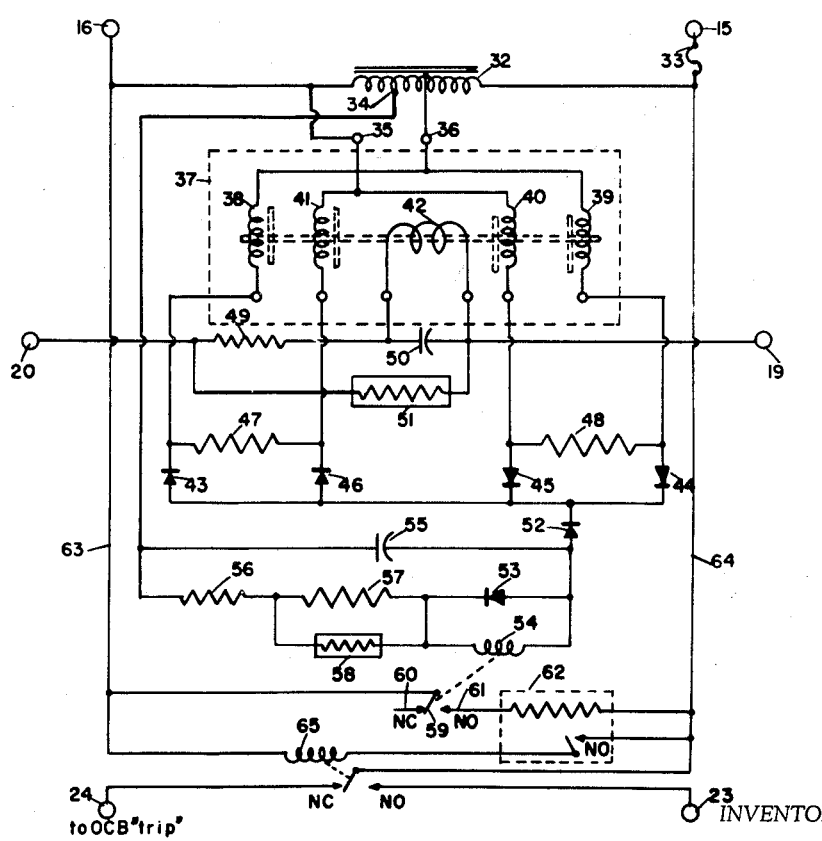
FIG. 2 is a diagram of a reactive power sensing circuit.

The control apparatus 18, as shown in FIG. 2 includes a transformer or inductor 32 connected between terminals 15 and 16 preferably in series with a fuse 33. Transformer 32 is provided with two output terminals 35 and 36 and a center tap 34 between them. A saturable reactor or magnetic amplifier 37 includes current windings 38, 39, 40 and 41 and a control winding 42. Each current winding is preferably wound on a separate core and control winding 42 is wound on the cores of all of current windings 38–41, FIG. 5. Current windings 38 and 39 are connected to terminal 36 at one end, and to blocking diode 43 and 44 at their other end while current windings 40 and 41 are connected to terminals 35 at one end, and to blocking diodes 45 and 46 at their other end. A resistor 48 is connected directly between the lower end of windings 39 and 40 and resistor 47 is connected directly to the lower end of windings 38 and 41. Resistors 47 and 48 permit the flow of a small current around each opposing diode to reset the flux level in the previously saturated core to approximately zero before the start of a new half-cycle. The control winding 42 is connected to terminals 19–20 through a phase-shifting network consisting of a resistor 49 and a capacitor 50 in shunt with a voltage-sensitive resistor 51, a control winding 42 being connected directly in parallel with capacitor 50. The function of resistor 51 is to limit the signal from pickup assembly 21 to a value which will not saturate reactor 38 and also to prevent damage to the apparatus by limiting voltage transients due to faults or lightning. The phase shifting network shifts the phase of the signal from pick-up assembly 21 into the region for most favorable operation. This network compensates the inherent characteristics of the saturable reactor to yield a zero signal output in the proper region so that the useful output relative to desired overall characteristic of the apparatus may be obtained.

An output network consisting of diodes 52 and 53, a relay coil 54, capacitor 55 and resistors 56, 57 and 58 is connected between the common connection of diodes 43–46 and the center tap 34 of transformer 32. The network consisting of resistors 56 and 57 and thermistor 58 compensates for changes in resistance of copper coil 54 with temperature. When no current is supplied to control winding 42, no output voltage appears between point 59 and center tap 34, since windings 38–41 saturate their cores simultaneously. If, however, a current of variable phase and magnitude with respect to the reference voltage across terminals 15 and 16 is supplied to control winding 42, coils 38–41 saturate at different times, giving rise to an average output current characteristic.

The energization of relay 54 causes its contact 59 to move from the normally closed position 60 to the normally open position 61 and thereby connect time-delay relay 62 across the line 63—64. This relay may be a thermal time delay relay. After a given time delay, relay 62 closes its normally open contact and connects the coil of relay 65 across line 63—64. Thereupon relay 65 switches its movable contacts from the normally closed position to its normally open position and thereby breaks the connection between terminal 24 and line 64 and makes the conection between terminal 23 and line 64. Terminal 24 is connected to the "trip" contact of oil-circuit breaker 30 so that when this contact is energized, the corrective capacitor 31 is disconnected from the power line 10—11. Normally, open contact of relay 65 which closes after expiration of a given time-delay when capacitive correction is required on the power line causes terminal 23 to energize a "close" coil or motor of oil circuit breaker 30 or a similar device.

The nature of the measurement which must be made by the circuit of FIG. 2 in order properly to connect and disconnect the capacitor from the line may be understood from FIGS. 6 and 7.

Referring to FIG. 6, V is the line voltage reference vector and I' represents a current vector at an angle $\theta'$, the cosine of which is a satisfactory corrected lagging power factor which may be 0.95. The current drawn by a fixed capacitor at constant voltage is constant and may be represented by a vector $I_c$ drawn perpendicular to the reference vector V. The line A—B may be drawn parallel to the vector O—I' and separated from it by the length of $I_c$ drawn perpendicular to V. $I_1$ and $I_2$ are typical load currents at angles $\theta_1$ and $\theta_2$ respectively, terminating on line A—B, which will be reduced in magnitude to $I_1'$ and $I_2'$ and phase angle to $\theta'$ by connection of a fixed capacitor drawing current $I_c$. A series of such load currents and their associated angles may determine the "operate" characteristic of the equipment.

In the vector diagram of FIG. 7, V is the voltage reference vector and I' represents a current vector at an angle of $\theta'$, which may be maximum allowable leading phase angle. Again the line C—D may be drawn parallel to O—I'. Load current vectors which terminate on line C—D represent magnitudes and phase angles which may be corrected to phase angle $\theta'$ if the capacitor is connected. Conversely, if the load current is $I_1'$ at angle $\theta'$ or $I_2'$ at angle $\theta'$, it will become $I_1$ at angle $\theta_1$ or $I_2$ at angle $\theta_2$ respectively when the capacitor is disconnected. A series of load currents and their associated angles terminating on line C—D may determine the "release" characteristic of the equipment.

The operation of one embodiment of the invention is illustrated in FIG. 8. When the load current and power factor rise to a value on or above the "operate line" and remain there for a given time the capacitor is connected. When the reactive power falls to a value represented by the "release line" and remains there for a sufficient time, the capacitor is disconnected.

From the above discussion, it is obvious that it is necessary to obtain a signal which is proportional to the load current and at a fixed phase angle with respect to the current.

The construction of saturable reactors such as reactor 37 is known in the art. FIG. 5 indicates one possible configuration of such a reactor. Coils 38 to 41 are each wound on a closed core 71–74 and control winding 42 is wound on one leg of all four cores 71–74. It will be understood, of course, that other arrangements of the current coils and control coil are possible.

Figure 3:
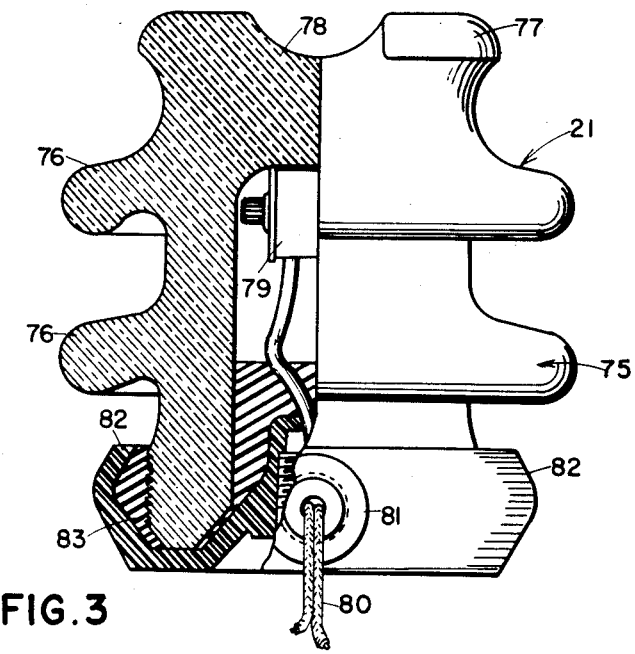
FIG. 3 is a view partly in section of a pick-up assembly.
Figure 4:
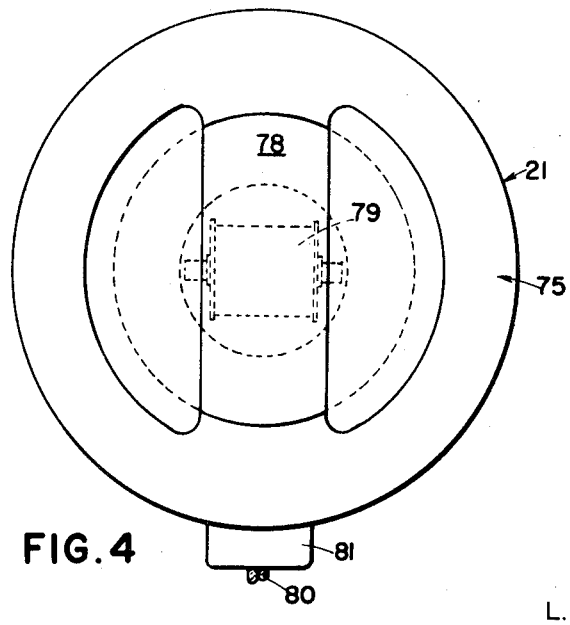
FIG. 4 is a top view of the pick-up assembly.

FIGS. 3 and 4 show a novel pick-up assembly providing a coupling to the transmission line, without electrical connection to the line, whereas a current transformer for example would require the primary winding to be connected in series with the line.

This pick-up assembly 21 includes a cylindrical insulator 75 which is cup-shaped and may be formed of porcelain or any other suitable material. The insulator may be provided with the usual annular petticoats 76 and at its closed end 77 has an external diametrical groove 78. Within the insulator, adjacent end wall 77, a pick-up coil 79 is mounted with its axis perpendicular to the direction of groove 78. A pair of leads 80 extend from the coil through a bushing 81 formed in a base 82 closing the open end of insulator 75. Base 82 is formed preferably of a metal casting fastened to the insulator 75 by means of a suitable cement 83 or other compound. The entire cavity of insulator 75 is preferably filled with insulating compound such as wax. The pickup assembly may be mounted so that the line 10 lies in the groove 78, whereby the current through the line induces a voltage in coil 79 which has a given magnitude and phase relation relative to the line current.

This pick-up assembly is claimed in U.S. application Serial No. 789,311, filed January 27, 1959, of which the present application is a division.

I claim:

1. Power factor correction apparatus for an alternating current power supply line, comprising a saturable reactor having a plurality of current windings each having a magnetic core, and a control winding wound around all said cores, means for deriving a center-tapped voltage proportional to the line voltage and having a fixed phase relation thereto, a rectifier connected in series with each current winding, the rectifiers being connected to the center-tapped reference voltage, said rectifiers being connected to said current windings with polarities such as to provide push-pull full-wave current flow through said current windings, coupling means positioned close to one conductor of said line but electrically separate from said line for deriving a second voltage related in phase and magnitude to the current in said line and for applying said second voltage to said control winding, a phase correcting capacitor, relay means connected to all said current windings and responsive thereto for connecting and disconnecting said capacitor across said line in response to first and second predetermined voltage-to-current relationships in said power line.

2. Power factor correction apparatus for an alternating current power supply line, comprising a saturable reactor having a plurality of current windings each having a magnetic core, and a control winding wound around all said cores, means for deriving a center-tapped voltage proportional to the line voltage and having a fixed phase relation thereto, a rectifier connected in series with each current winding, means for applying across each current winding and the rectifier connected to one side of the center-tapped reference voltage, said rectifiers being connected to said current windings with polarities such as to provide push-pull full-wave current flow through said current windings, means physically separate from said line for deriving a second voltage related in phase and magnitude to the current in said line and for applying said second voltage to said control winding, relay means connected to all said current windings, a phase-correcting capacitor, and means including a time delay device connected to said relay means and responsive thereto for connecting and disconnecting said capacitor across said line in response to first and second predetermined voltage-to-current relationships in said supply line.

3. Power factor correction apparatus for an alternating current current power supply line, comprising a saturable reactor having a plurality of current windings each having a magnetic core, and a control winding wound around all said cores, means for deriving a center-tapped voltage proportional to the line voltage and having a fixed phase relation thereto, a rectifier connected in series with each current winding, means for applying across each current winding and the rectifier connected thereto one side of the center-tapped reference voltage, said rectifiers being connected to said current windings with polarities such as to provide push-pull full-wave current flow through said current windings, coupling means adjacent to but separate from said line for deriving a second voltage related in phase and magnitude to the current in said line, phase shifting means connecting said coupling means to said control winding, a direct current circuit including a rectifier and first relay means connected in series with each other and to all said current windings, a phase-correcting capacitor, and time delay relay means connected to said first relay means and responsive thereto for connecting and disconnecting said capacitor across said line in response to first and second predetermined voltage-to-current relationships in said power supply line.

4. Power factor correction apparatus for an alternating current current power supply line, comprising a saturable reactor comprising four current windings having magnetic cores and a control winding wound around said cores, means for deriving a first voltage proportional to the line voltage and having a fixed phase relation thereto, means for converting said first voltage to a two-phase voltage, a rectifier connected in series with each current winding, means for applying each phase of the two phase reference voltage to two current windings and the rectifiers connected thereto, said rectifiers being connected to said current windings with polarities such as to provide push-pull full-wave current flow through said current windings, means electrically separate from said line for deriving a second voltage related in phase and magnitude to the current in said line and for applying said second voltage to said control winding, relay means connected in series to all said current windings, a phase-correcting capacitor, means including a time delay device connected to said relay means and responsive thereto for connecting and disconnecting said capacitor across said line in response to first and second predetermined voltage-to-current relationships in said power supply line, and means for energizing said relay means and said time delay device with said first voltage.

5. Power factor correction apparatus for an alternating current current power supply line, comprising a full-wave magnetic amplifier including saturable reactor having a plurality of current windings each having a magnetic core, and a control winding wound around all said cores, means for deriving a center-tapped voltage proportional to the line voltage and having a fixed phase relation thereto, means for applying across each current winding one side of the center-tapped reference voltage, means electrically separate from said line for deriving a second voltage related in phase and magnitude to the current in said line and for applying said second voltage to said control winding, relay means connected to all said current windings, a phase-correcting capacitor, and means including a time delay device connected to said relay means and responsive thereto for connecting and disconnecting said capacitor across said line in response to first and second predetermined voltage-to-current relationships in said power supply line.

6. Apparatus for sensing the direction of power flow in a circuit, comprising a saturable reactor having a plurality of current windings each having a magnetic core, and a control winding wound round all said cores, means for deriving a center-tapped voltage proportional to the line voltage and having a fixed phase relation thereto, a rectifier connected in series with each current winding, means for applying across each current winding and the rectifier connected thereto one side of the center-tapped reference voltage, said rectifiers being connected to said current windings with polarities such as to provide push-pull full-wave current flow through said current windings, coupling means for deriving a second voltage from said line related in phase and magnitude to the current in said line and for applying said second voltage to said control winding, relay means connected in series with all said current windings to the voltage-to-current relationships in said power supply line.

References Cited in the file of this patent

UNITED STATES PATENTS

| | | |
|---|---|---|
| 2,484,575 | Livingston | Oct. 11, 1949 |
| 2,506,282 | Sillers | May 2, 1950 |
| 2,887,641 | Scharstein et al. | May 19, 1959 |